United States Patent
Copenhaver

(10) Patent No.: US 10,746,518 B1
(45) Date of Patent: Aug. 18, 2020

(54) SYSTEM FOR TRUING ASPECTS OF A CARTRIDGE CASE

(71) Applicant: Alan R. Copenhaver, Hinton, IA (US)

(72) Inventor: Alan R. Copenhaver, Hinton, IA (US)

( * ) Notice: Subject to any disclaimer, the term of this patent is extended or adjusted under 35 U.S.C. 154(b) by 119 days.

(21) Appl. No.: 16/111,321

(22) Filed: Aug. 24, 2018

(51) Int. Cl.
| | |
|---|---|
| *B23B 5/16* | (2006.01) |
| *F42B 33/10* | (2006.01) |
| *F42B 35/02* | (2006.01) |
| *F42B 5/02* | (2006.01) |
| *F42B 5/28* | (2006.01) |

(52) U.S. Cl.
CPC ............ *F42B 35/02* (2013.01); *F42B 33/10* (2013.01); *B23B 5/16* (2013.01); *B23B 5/167* (2013.01); *B23B 2215/10* (2013.01); *F42B 5/025* (2013.01); *F42B 5/28* (2013.01)

(58) Field of Classification Search
CPC .......... F42B 35/02; F42B 33/10; F42B 33/14; F42B 5/28; F42B 5/26; B23B 5/16; B23B 5/165; B23B 5/167; B23B 5/168; B23B 2215/10
USPC ............................ 86/19.5, 19.7, 24, 44, 19.6
See application file for complete search history.

(56) References Cited

U.S. PATENT DOCUMENTS

| | | | |
|---|---|---|---|
| 2,744,307 A | 5/1956 | Smiley | |
| 3,274,661 A | 9/1966 | Westbrook | |
| 3,818,563 A | 6/1974 | Beaulieu | |
| 4,653,157 A | 3/1987 | Alexander | |
| 4,742,606 A * | 5/1988 | Burby | B23B 5/16 408/127 |
| 4,860,453 A | 8/1989 | Carroll | |
| 5,064,320 A | 11/1991 | Markle | |
| 5,088,169 A | 2/1992 | Touzet | |
| 5,125,316 A | 6/1992 | Markle | |
| 5,497,539 A * | 3/1996 | Blodgett | B23B 5/168 408/112 |
| 5,788,429 A * | 8/1998 | Gracey | B23B 5/168 408/234 |

(Continued)

OTHER PUBLICATIONS

Kerry Adams, "The Misleading Case of Expander Balls and Neck Concentricity", web page https://precisionshooter.info/misleading-case-expander-balls-neck-concentricity/, pp. 1-10, download date Aug. 7, 2018.

(Continued)

*Primary Examiner* — James S Bergin
(74) *Attorney, Agent, or Firm* — Jeffrey A. Proehl; Woods, Fuller, Shultz & Smith, PC

(57) ABSTRACT

A method and apparatus for truing a cartridge case with an apparatus including a frame defining a chamber and having a central axis, and a cartridge sleeve defining a cartridge passage with a passage surface for engaging the exterior surface of the body of the case, and a tool extending along the central axis of the frame with a tip end extending into the chamber. The frame may include a tool mandrel portion configured to mount the tool on the frame, and a sleeve mandrel portion configured to mount the cartridge sleeve on the frame. The sleeve mandrel portion may permit the cartridge sleeve and a cartridge case mounted thereon to translate with respect to the frame along the central axis of the frame, the sleeve mandrel portion permitting the cartridge sleeve and a cartridge case mounted thereon to rotate about the central axis with respect to the frame.

22 Claims, 5 Drawing Sheets

(56) References Cited

U.S. PATENT DOCUMENTS

| | | | |
|---|---|---|---|
| 6,050,169 A | 4/2000 | Voros | |
| 6,101,915 A * | 8/2000 | Sinclair | F42B 33/10 |
| | | | 409/140 |
| 6,192,561 B1 * | 2/2001 | Bennett | B21D 41/04 |
| | | | 72/118 |
| 7,650,825 B1 | 1/2010 | Lee | |
| 9,022,704 B1 | 5/2015 | Goodman | |
| 9,146,087 B2 * | 9/2015 | Cottrell | F42B 33/10 |
| 9,541,365 B2 * | 1/2017 | Giraud | F42B 33/10 |
| 9,574,860 B1 | 2/2017 | Mobley | |
| 9,696,124 B2 | 7/2017 | Keska | |
| 9,970,741 B1 * | 5/2018 | Eldredge | B23B 5/16 |
| 2019/0128655 A1 * | 5/2019 | Peters | F42B 33/10 |

OTHER PUBLICATIONS

Bob Kohl, "Bullet Concentricity & Related Issues", web page https://www.sinclairintl.com/guntech/bullet-concentricity-related-issues/, pp. 1-5, download date Aug. 7, 2018.

\* cited by examiner

SYSTEM FOR TRUING ASPECTS OF A CARTRIDGE CASE

BACKGROUND

Field

The present disclosure relates to ammunition reloading apparatus and more particularly pertains to a new system for truing aspects of a cartridge case for improving the accuracy of target shots by the bullet of the cartridge.

SUMMARY

In one aspect, the present disclosure relates to a cartridge case truing apparatus for centering a cartridge case, and the cartridge case my have a mouth, a neck, a body, and a base opposite of the mouth, and an exterior surface on at least the body and the neck of the case. The apparatus may comprise a frame defining a chamber and having a central axis passing through the chamber, and a cartridge sleeve defining a cartridge passage for receiving the cartridge case. The cartridge passage may be defined by a passage surface for engaging the exterior surface of the body of the cartridge case when the case is inserted into the passage. The apparatus may further include a tool extending along the central axis of the frame with a tip end extending into the chamber of the frame. A tool mandrel portion may be configured to mount the tool on the frame, and a sleeve mandrel portion configured to mount the cartridge sleeve on the frame. The sleeve mandrel portion may permit the cartridge sleeve and a cartridge case mounted thereon to translate with respect to the frame along the central axis of the frame, and may permit the cartridge sleeve and a cartridge case mounted thereon to rotate about the central axis with respect to the frame.

In another aspect, the disclosure relates to a method of truing a cartridge case including providing a cartridge case having a mouth, a neck, a body, and a base opposite of the mouth, with the cartridge case further having an exterior surface on at least the body and the neck of the case. The method may further comprise providing an apparatus including a frame defining a chamber and having a central axis passing through the chamber, a cartridge sleeve having a cartridge passage defined by a passage surface, and a tool extending along the central axis of the frame with a tip end extending into the chamber of the frame. A tool mandrel portion may have the tool mounted thereon in a manner preventing rotation and translation of the tool with respect to the frame, and a sleeve mandrel portion configured to receive the cartridge sleeve. The method may further include inserting the cartridge case into the cartridge passage of the cartridge sleeve. The method may also include contacting the mouth of the cartridge case with the tool by rotating the cartridge case in the sleeve passage about the central axis with respect to the tool, and by translating the cartridge sleeve in the sleeve passage along the central axis to move the cartridge case toward the tip end of the tool. The translating of the cartridge case may be performed substantially simultaneously with rotating the cartridge case, and the method may also include advancing the cartridge case along the central axis to move the tip end of the tool into the neck of the cartridge case while rotating the case with respect to the tool.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
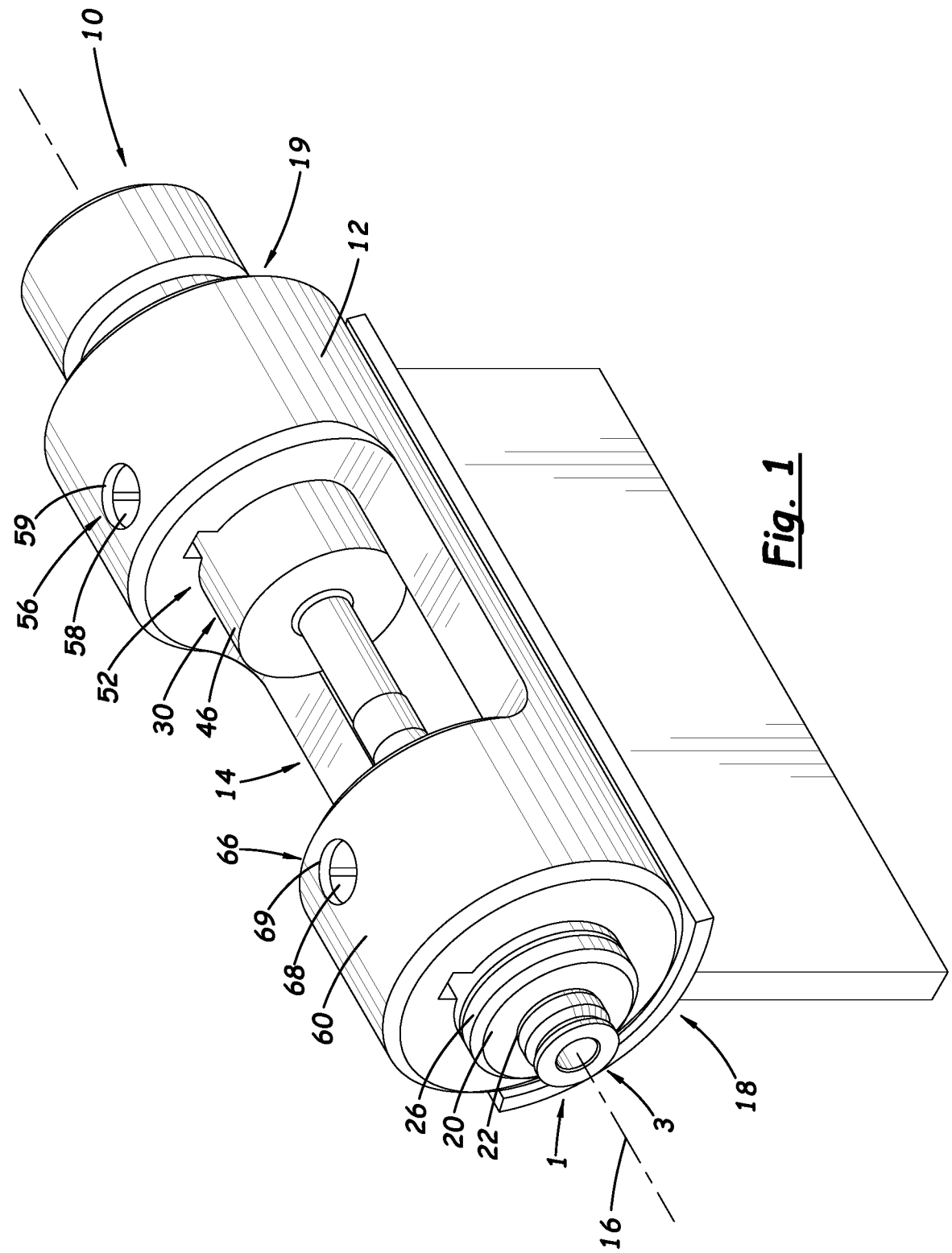
FIG. 1 is a schematic perspective view of a new apparatus for truing aspects of a cartridge case according to the present disclosure.

With reference now to the drawings, and in particular to FIGS. 1 through 5 thereof, a new system for truing aspects of a cartridge case embodying the principles and concepts of the disclosed subject matter will be described.

Reloading ammunition after usage is a popular way of reducing the cost of target practice through reusing the case of an ammunition cartridge by installing new propellant (or gunpowder), a new primer and a new bullet projectile on the used cartridge case. While a cartridge case may be reloaded and reused many times, each firing of ammunition causes the cartridge case to momentarily expand within the chamber of the firearm and as a consequence may tend to cause physical distortions of the cartridge case that persist even after firing. These distortions can produce variations in the manner in which the projectile is fired from the cartridge case, and as a consequence the accuracy and repeatability of the path of the projectile can vary significantly from one reloaded cartridge to another reloaded cartridge.

The applicant has recognized that many conventional devices have been developed for determining the distortions of the cartridge case, and reforming the cartridge case to a more uniform configuration to improve the accuracy and repeatability of the path of the projectile. However, such devices tend to focus upon resizing the mouth opening of the case and trimming away excess material from the case wall to seek a more uniform case wall thickness, without adequately addressing first centering the mouth and neck of the case with respect to the body of the case, after which further refinements, such as making the thickness of the case wall more uniform, may be attempted.

The applicant has devised an apparatus which is highly suitable for truing, or centering, the location of the mouth opening, and optionally also the neck, of the case with respect to the body, and the exterior surface of the body, to benefit the accuracy and repeatability of the path of the projectile fired from the cartridge case.

In one aspect, the disclosure relates to a cartridge case truing apparatus 10 for centering an ammunition cartridge case 1, and may center the mouth 2 of the cartridge case 1 with respect to a body 3 of the cartridge case. Further, the apparatus 10 may be configured to center a neck 4 of the cartridge case with respect to the body 3 of the case. The cartridge case 1 may have a base 5 located opposite of the mouth 2 of the case, and an exterior surface 6 which extends about at least the body 3 and the neck 4 of the case. The neck of the cartridge case may also have an interior surface 7.

In greater detail, the apparatus 10 may include a frame 12 which may define a chamber 14 that may be partially enclosed, and a central axis 16 may pass through the chamber. The frame 12 may be elongated in shape with a cartridge end 18 and a tool end 19.

Figure 2:
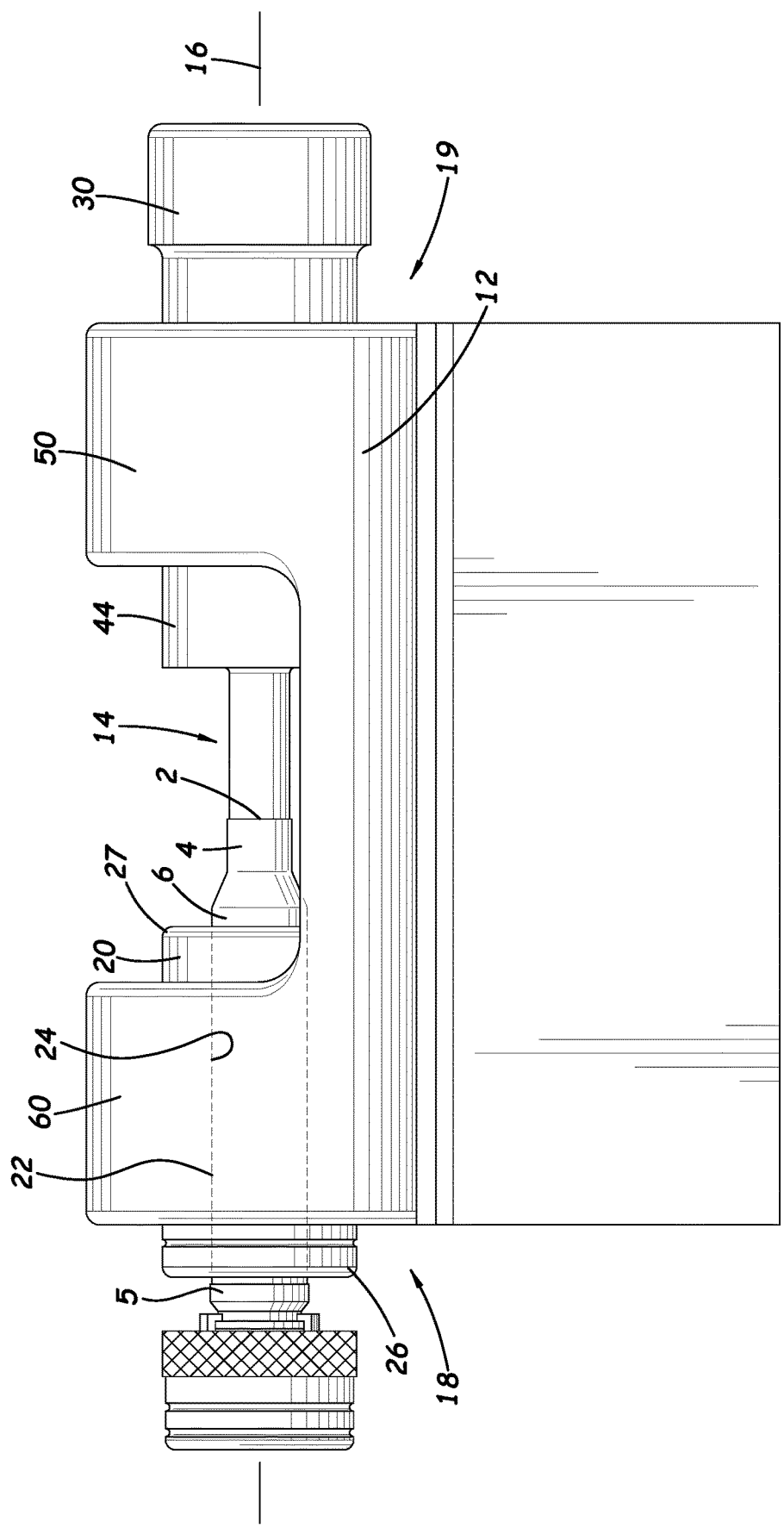
FIG. 2 is a schematic partially assembled side view of the apparatus, according to an illustrative embodiment.
Figure 3:
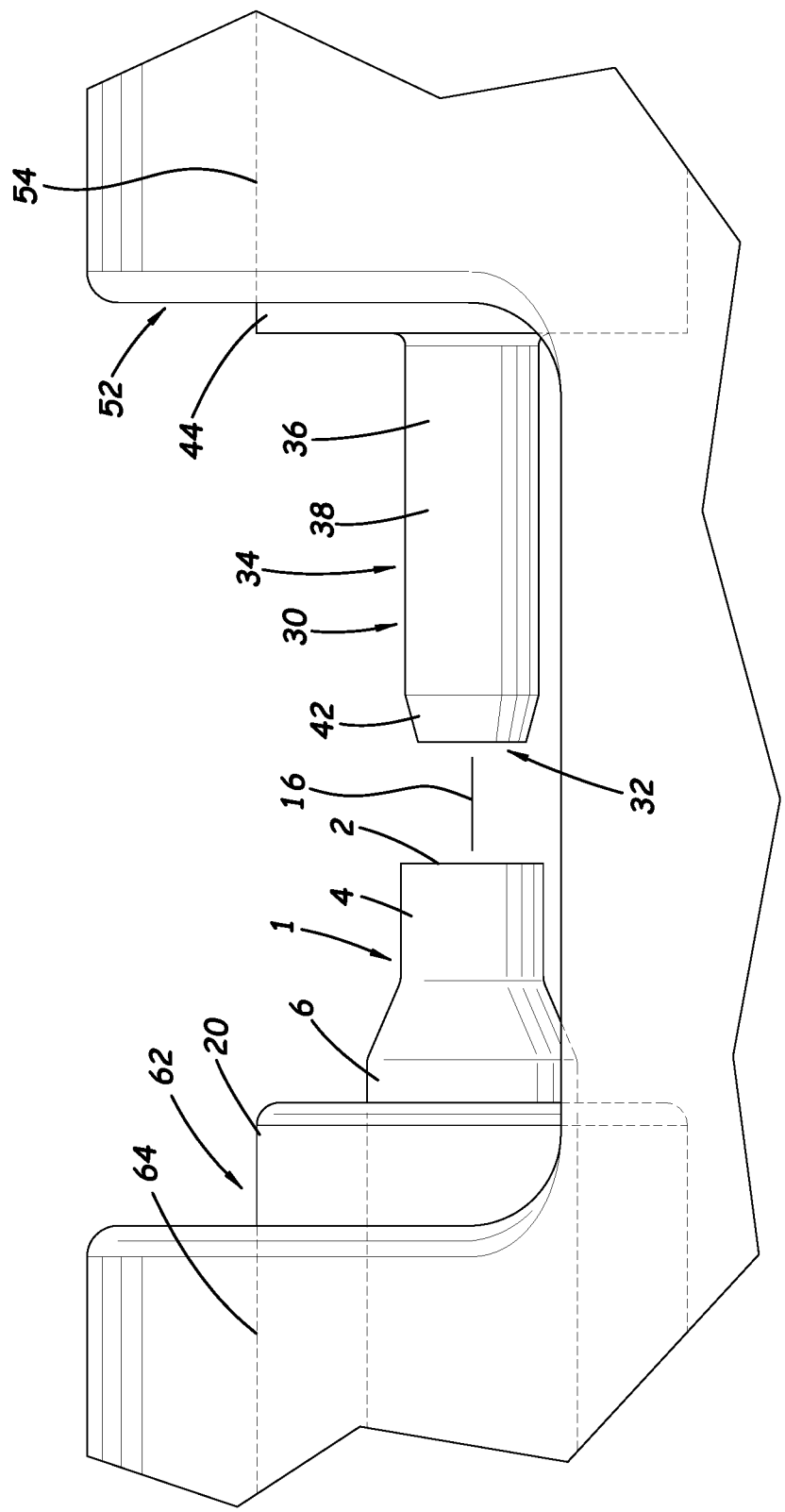
FIG. 3 is a schematic side view of a portion of the apparatus showing the tool disengaged from the cartridge case, according to an illustrative embodiment.
Figure 4:
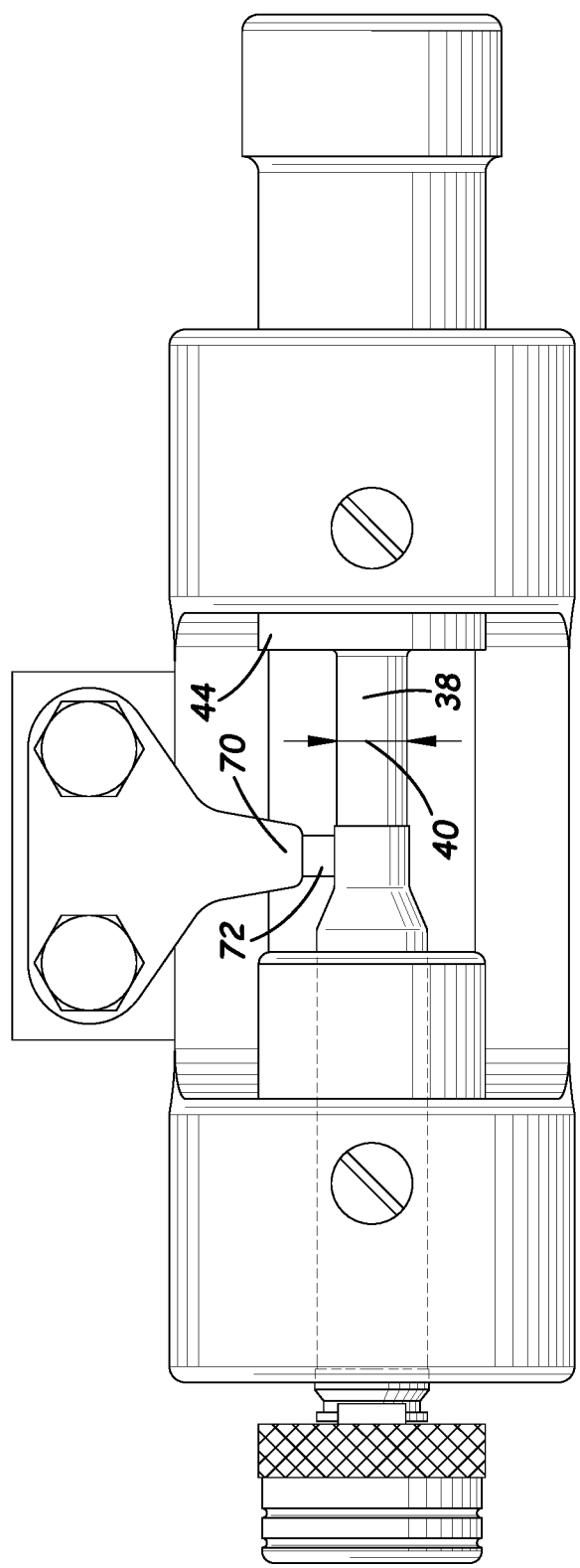
FIG. 4 is a schematic top view of a portion of the apparatus showing the tool engaged with the cartridge case with a cutting tool engaging the exterior of the case, according to an illustrative embodiment.

The apparatus may also include a cartridge sleeve 20 which defines a cartridge passage 22 which receives the cartridge case 1 to be trued. The cartridge passage 22 may be defined by a passage surface 24 which is configured to engage or abut the exterior surface 6 of the body of the case to constrain free movement of the body portion of the cartridge case with respect to the sleeve 20, particularly in directions lateral to the central axis. While the exterior surface of other portions of the cartridge case may also be engaged by the sleeve 20, typically the passage surface 24 is oversized with respect to the exterior surface 6 of the neck of the case to not engage or abut the neck of the cartridge case and thereby permit a degree of relatively free movement of the neck portion of the cartridge case with respect to the sleeve 20 in the lateral directions. The cartridge sleeve 20 may be elongated with a base end 26 and the neck end 27 with the cartridge passage 22 extending between the ends 26, 27. Typically, the length of the cartridge sleeve between the ends 26, 27 and along the central axis 16 may be shorter than the length of the cartridge case to be trued by the apparatus such that the base 5 and at least a portion of the neck 4 extend beyond the respective base 26 and neck 27 ends of the sleeve. Extension of the base 5 of the cartridge case beyond the base end 26 of the cartridge sleeve 20 permits an engaging tool such as the jaws of a drill chuck to grip the base, as shown in FIG. 2, to rotate the cartridge.

The apparatus 10 may further include a tool 30 which has at least a portion which extends along the central axis 16 of the frame 12. The tool 30 may have a tip end 32 which extends into the chamber 14 of the frame, and may be a free end for engaging the mouth 2 of a cartridge case to be trued. In some embodiments, the tool 30 may have an insertion portion 34 which has the tip end 32 of the tool and is configured to insert into the mouth 2 of the cartridge case, and may be configured to insert through the mouth and into the neck 4 of the case to engage the interior surface 7 of the neck. The insertion portion has an outer surface 36 for engaging the cartridge case to be trued.

In greater detail, the insertion portion 34 may include a main section 38, and the outer surface 36 on the main section may have a substantially circular cross sectional shape with a primary diameter 40 that provides the outer surface with a substantially cylindrical shape. The primary diameter of the main section may be substantially uniform along the length of the main section, and the primary diameter may correspond to the desired diameter of the mouth 2 of the cartridge case, and also the desired diameter of the interior surface 7 of the neck 4 of the case. In some embodiments, the primary diameter may be just slightly larger than the nominal diameter of the opening at the mouth of the cartridge, so that the insertion of the free end of the tool into the mouth opening tends to slightly enlarge the diameter of the mouth opening. Illustratively, the primary diameter may be approximately 0.001 inch, although other dimeters may be used.

The insertion portion 34 may also include a tapered section 42 which is located toward the tip end 32 of the portion 34, and the outer surface 36 of the tapered section may have a tapering diameter which becomes smaller toward the tip end and larger toward the main section 38. The tapering may be substantially conical, although more rounded tapering may also be employed. The tapering of the diameter of the tapered section facilitates insertion of the tip end 32 into the mouth 2 of the cartridge case particularly when the mouth 2 is not completely centered on the central axis 16. The tool 30 may further have a mounting portion 44 for mounting on the frame 12, and the mounting portion may have an outer chuck surface 46 which is substantially cylindrical in shape although other shapes may be employed.

A tool mandrel portion 50 may be configured to mount the tool 30 on the frame, and may removably mount the tool on the frame to permit interchange of different tools on the frame to suit different sizes and types of cartridge cases. The mandrel portion 50 may be located adjacent to the chamber 14 of the frame. The tool mandrel portion may permit the tool to translate with respect to the frame 12 along the central axis 16 for positioning the tip end of the tool in the chamber, and in some embodiments may also permit the tool to rotate about the central axis with respect to the frame.

The mandrel portion may include a tool chuck 52 for receiving the mounting portion 44 of the tool when the tool is mounted on the frame. The tool chuck may include a tool passage 54 which extends into the tool mandrel portion from the chamber 14, and may extend through the mandrel portion to the tool end 19 of the frame. The tool passage 54 may be centered on the central axis 16 of the frame to hold the tool in a centered relationship on the axis 16. In some embodiments, the tool chuck 52 may include a tool securing element 56 which is configured to secure the tool 30 against translational movement and against rotational movement with respect to the frame 12. Illustratively, the tool securing element 56 may comprise a set screw 58 positioned in a hole 59 which is in communication with the tool passage 54 such that advancement of the set screw in the hole brings the screw into contact with the chuck surface 46 of the mounting portion to resist movement, and conversely retraction of the set screw into the hole takes the screw out of contact with the chuck surface 46 to permit movement of the tool relative to the frame, as well as allowing removal of the tool from the frame. During use of the apparatus 10, the set screw may typically be positioned against the chuck surface to resist translation and rotation of the tool with respect to the frame.

A sleeve mandrel portion 60 may be configured to mount the cartridge sleeve 20 on the frame, and may removably mount the sleeve 20 on the frame. The sleeve mandrel portion 60 may permit the cartridge sleeve 20 and a cartridge case mounted thereon to translate with respect to the frame along the central axis 16, and may permit the cartridge sleeve and a case mounted thereon to rotate with respect to the frame about the central axis.

In some embodiments, the sleeve mandrel portion 60 may include a sleeve chuck 62 for receiving the cartridge sleeve 20. The cartridge sleeve portion may include a sleeve passage 64 for receiving the cartridge sleeve, and the passage may be centered on the central axis. The sleeve passage may extend into the sleeve mandrel portion from the chamber 14, and may extend through the sleeve mandrel portion to the cartridge end 18 of the frame. The sleeve chuck 62 may include a cartridge sleeve securing element 66 which is configured to secure the cartridge sleeve against translational movement and against rotational movement with respect to the frame. Illustratively, the cartridge sleeve securing element may comprise a set screw 68 which is positioned in a hole 69 formed in the sleeve mandrel portion which is in communication with the sleeve passage such that advancement of the set screw in the hole brings the screw into contact with the surface of the cartridge sleeve to resist movement of the cartridge sleeve with respect to the mandrel 60, such as translation and rotation. Conversely, retraction of the set screw 68 into the hole 69 moves the screw out of contact with the surface of the sleeve 20 to permit movement of the sleeve relative to the frame. During use of the apparatus 10, the set screw 68 may typically be positioned out of contact with the surface of the sleeve 20 to permit relatively free rotation of the sleeve and a cartridge therein with respect to the frame.

Optionally, a cutting tool 70 may be provided to remove material from the neck of the case to provide a more uniform thickness of the wall of the case forming the neck. Such removal of material from the neck of the case may be performed after the mouth and the neck of the case have been trued with respect to the body of the cartridge, and could be performed simultaneous with the truing of the neck although truing the elements of the cartridge first is preferred. At least a portion of the cutting tool 70 may be positioned or positionable in the chamber 14 and be configured to contact the exterior surface 6 of the neck 4 of the case in order to remove material from the exterior surface of the case. The cutting tool 70 may be provided with a sharpened point or edge 72 capable of cutting away material from the wall of the neck at relatively thicker portions of the wall to better match the thickness of the wall at the relatively thinner portions of the wall to achieve a more uniform wall thickness at all portions. Illustratively, the cutting tool 70 may be mounted on a saddle formed on the frame adjacent to the chamber which may permit some degree of adjustment of the positioning of the tool, and in particular the cutting edge 72, with respect to the neck of the cartridge case.

Figure 5:
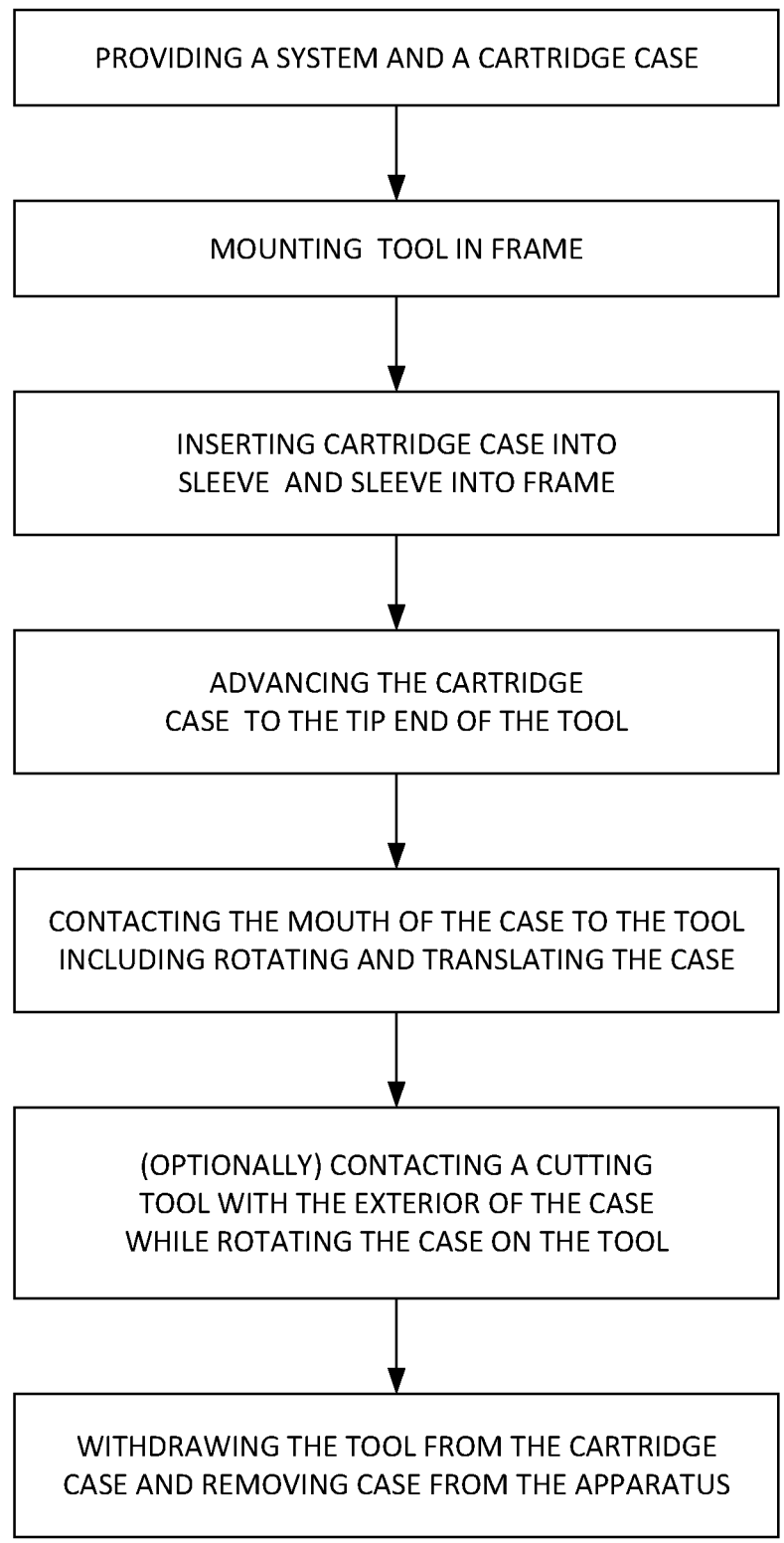
FIG. 5 is a schematic diagram of a method of truing a cartridge case, according to an illustrative implementation.

In another aspect, the disclosure relates to a method of truing a cartridge case, such as is schematically depicted in FIG. 5, and may include centering the mouth and neck of the case with respect to the body of the case. The method may include providing a cartridge case truing apparatus having some or all of the elements described in this disclosure. The method may also include providing a cartridge case having one or more the features of a cartridge case described herein.

The method may include mounting the tool 30 in the frame 12 which may further comprise positioning the mounting portion 44 of the tool in the tool passage 54 of the tool mandrel 50 of the frame, and placing the tip end 32 of the tool in the chamber 14 of the frame such that the end is on the central axis of the frame. In preferred implementations of the method, the tool is secured against rotation and translation with respect to the tool mandrel portion and thereby the frame, when the apparatus is being used to true the cartridge case, and typically is only translated and/or rotated during setup of the apparatus for use and tear down of the apparatus after use.

Additionally, the method may comprise inserting the cartridge case 1 into the cartridge sleeve 20, such as by inserting the cartridge case into the cartridge passage 22 of the cartridge sleeve, and such insertion may position a portion of the neck of the cartridge case beyond the neck end 27 of the cartridge sleeve and the base of the cartridge beyond the base end 26 of the sleeve.

The cartridge sleeve 20 may be mounted on the frame 12, which may be accomplished by inserting the cartridge sleeve 20 into the sleeve passage 64 of the sleeve mandrel portion 60 of the frame. Such mounting positions at least a portion of the neck of the cartridge case in the chamber 14 of the frame with the mouth of the case generally centered on the central axis of the frame, but not necessarily entirely or perfectly trued on the central axis.

The method may continue by contacting the mouth 2 of the cartridge case with the tool 30, which may be accomplished by pressing the mouth of the cartridge case against the tip end 32 of the tool, and penetrating the tapered section 42 of the insertion portion 34 of the tool into the mouth and neck of the cartridge case. Contacting the mouth and neck of the cartridge with the tool may be accomplished by rotating the cartridge case about the central axis 16 and with respect to the tool 30. This may be accomplished by gripping the base of the cartridge case with a suitable tool or even the fingers of the user to cause rotation of the cartridge case. Such action may cause the cartridge sleeve 20 to rotate with the cartridge case and to rotate the cartridge sleeve with respect to the frame, although such actions may not necessarily result from the rotation of the cartridge base. Contacting the neck of the cartridge with the tool may also be accomplished by translating the cartridge case, along the central axis and with respect to the tool 30, which may include translating the cartridge sleeve in the sleeve passage 64 of the sleeve mandrel portion of the frame. This may be accomplished by pushing the base 5 of the cartridge case in a direction toward the tool 30. In some preferred implementations of the method, the translational movement of the cartridge case may be performed substantially simultaneously with rotational movement of the case as the case contacts the tool. Rotational movement of the case may be continued after translational movement of the case has been discontinued, while in many implementations translational movement of the case may not be performed without rotational movement.

The method may further include advancing the cartridge case along the central axis to move the tip end of the tool into the neck of the cartridge case, and may include moving the insertion portion of the tool into the neck of the case to contact the interior surface 7 of the neck. The translational movement of the case may be continued until substantially the entire interior surface of the neck is contacted by the tool, and rotation of the case may continue until it is determined that the mouth the neck have been trued with respect to the central axis, which may be indicated by sensing relatively less or decreasing resistance to the rotation of the case with respect to the tool.

Optionally, the method may include contacting a cutting tool 70 against the exterior surface of the neck of the cartridge case as the cartridge case is rotated to remove material from the exterior surface of the cartridge case and thus the wall forming the neck of the cartridge case. In some implementations, the cutting tool may travel along the exterior surface of the neck in a direction that is parallel to the central axis 16 to move material from the wall.

Completion of the method may include withdrawing the insertion portion of the tool from the neck portion and mouth of the cartridge case, and removal of the cartridge casing from the cartridge sleeve of the apparatus 10.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A cartridge case truing apparatus for centering a cartridge case, the cartridge case having a mouth, a neck, a body, and a base opposite of the mouth, the cartridge case having an exterior surface on at least the body and the neck of the case, the apparatus comprising:
   a frame defining a chamber and having a central axis passing through the chamber;
   a cartridge sleeve defining a cartridge passage for receiving the cartridge case, the cartridge passage being defined by a passage surface for engaging the exterior surface of the body of the cartridge case when the case is inserted into the passage;
   a tool extending along the central axis of the frame with a tip end extending into the chamber of the frame for moving into the mouth of the cartridge case when the cartridge case is positioned in the cartridge passage;
   a tool mandrel portion mounting the tool on the frame in a manner resisting rotation of the tool with respect to frame; and
   a sleeve mandrel portion configured to mount the cartridge sleeve on the frame, the sleeve mandrel portion permitting the cartridge sleeve and a cartridge case mounted thereon to translate with respect to the frame along the central axis of the frame, the sleeve mandrel portion permitting the cartridge sleeve and a cartridge case mounted thereon to rotate about the central axis with respect to the frame;
   wherein the cartridge sleeve is configured to engage the exterior surface of the body of the cartridge case while leaving the base of the cartridge case free of engagement by the cartridge sleeve to permit engagement of the base of the cartridge case to rotate the case.

2. The apparatus of claim 1 wherein the cartridge sleeve is configured to not engage the exterior surface of the cartridge case at the neck of the case.

3. The apparatus of claim 1 wherein the cartridge passage of the cartridge sleeve has a length in the direction of the central axis which exposes the base of the cartridge for permitting the base to be engaged to rotate the cartridge case.

4. The apparatus of claim 1 wherein the tool has an insertion portion configured to insert into the mouth of the cartridge case and having the tip end of the tool, the insertion portion having an outer surface, the insertion portion including a main section having a primary diameter.

5. The apparatus of claim 4 wherein the insertion portion of the tool has a tapered section located toward the tip end of the insertion portion, the outer surface of the tapered section having a tapering diameter tapering smaller toward the tip end.

6. The apparatus of claim 5 wherein the primary diameter of the main section being substantially uniform along a length of the main section.

7. The apparatus of claim 6 wherein the primary diameter corresponds to a desired diameter of an interior surface of the neck of the cartridge case.

8. The apparatus of claim 6 wherein the primary diameter is slightly larger than a diameter of the opening at the mouth of the cartridge such that insertion of the free end of the tool into the mouth opening tends to slightly enlarge the diameter of the mouth opening.

9. The apparatus of claim 4 wherein the insertion portion has a length configured to insert through the mouth and into the neck of the cartridge case.

10. The apparatus of claim 1 wherein the sleeve mandrel portion removably mounts the cartridge sleeve on the frame.

11. The apparatus of claim 1 wherein the sleeve mandrel portion forming a sleeve chuck with a sleeve passage for receiving the cartridge sleeve, the sleeve passage being centered on the central axis of the frame.

12. The apparatus of claim 11 wherein the sleeve chuck includes a cartridge sleeve securing element configured to secure the cartridge sleeve against translation movement and against rotational movement with respect to the frame.

13. The apparatus of claim 1 wherein the tool mandrel portion removably mounts the tool on the frame.

14. The apparatus of claim 1 wherein the tool mandrel portion is configured to permit the tool to translate with respect to the frame along the central axis of the frame.

15. The apparatus of claim 1 additionally comprising a cutting tool mounted on the frame and positionable against the exterior surface of the neck of the cartridge case to remove material from the exterior surface of the cartridge case.

16. A method of truing a cartridge case including:
providing a cartridge case having a mouth, a neck, a body, and a base opposite of the mouth, the cartridge case having an exterior surface on at least the body and the neck of the case;
providing an apparatus including:
a frame defining a chamber and having a central axis passing through the chamber;
a cartridge sleeve having a cartridge passage defined by a passage surface;
a tool extending along the central axis of the frame and having an insertion portion with a tip end extending into the chamber of the frame;
a tool mandrel portion having the tool mounted thereon in a manner preventing rotation and translation of the tool with respect to the frame; and
a sleeve mandrel portion defining a sleeve passage configured to receive the cartridge sleeve;
inserting the cartridge case into the cartridge passage of the cartridge sleeve;
contacting the mouth of the cartridge case with the tool by:
rotating the cartridge case in the sleeve passage of the sleeve mandrel portion about the central axis with respect to the tool; and
translating the cartridge sleeve in the sleeve passage along the central axis to move the cartridge case toward the tip end of the tool;
wherein the translating of the cartridge case is performed substantially simultaneously with rotating the cartridge case; and
advancing the cartridge case along the central axis to move the tip end of the tool into the neck of the cartridge case while rotating the case with respect to the tool.

17. The method of claim 16 additionally including inserting the cartridge sleeve into the sleeve passage of the frame in a manner such that the passage surface of the sleeve contacts the exterior surface of the cartridge case.

18. The method of claim 16 additionally including moving the insertion portion of the tool into the neck of the cartridge case to contact an interior surface of the neck.

19. The method of claim 16 additionally including contacting a cutting tool against the exterior surface of the neck of the cartridge case as the cartridge case is rotated about the tool to remove material from the exterior surface of the cartridge case.

20. A cartridge case truing apparatus for centering a cartridge case, the cartridge case having a mouth, a neck, a body, and a base opposite of the mouth, the cartridge case having an exterior surface on at least the body and the neck of the case, the apparatus comprising:
a frame defining a chamber and having a central axis passing through the chamber;
a cartridge sleeve defining a cartridge passage for receiving the cartridge case, the cartridge passage being defined by a passage surface for engaging the exterior surface of the body of the cartridge case when the case is inserted into the passage, the cartridge sleeve having opposite neck and base ends;
a tool extending along the central axis of the frame with a tip end extending into the chamber of the frame for moving into the mouth of the cartridge case when the cartridge case is positioned in the cartridge passage;
a tool mandrel portion mounting the tool on the frame in a manner resisting rotation of the tool with respect to frame; and
a sleeve mandrel portion configured to mount the cartridge sleeve on the frame, the sleeve mandrel portion permitting the cartridge sleeve and a cartridge case mounted thereon to translate with respect to the frame along the central axis of the frame, the sleeve mandrel portion permitting the cartridge sleeve and a cartridge case mounted thereon to rotate about the central axis with respect to the frame;
wherein the cartridge sleeve is configured to engage the exterior surface of the body of the cartridge case without engaging the base of the cartridge case and without engaging the mouth of the cartridge case such that a portion of the neck extends beyond the neck end of the cartridge sleeve and a portion of the base of the cartridge extends beyond the base end of the cartridge sleeve.

21. The apparatus of claim 20 wherein the tool has an insertion portion with a main section having a primary diameter which is substantially uniform along a length of the main section, the primary diameter corresponding to a desired diameter of the mouth of the cartridge case and an interior surface of the neck of the cartridge case.

22. The apparatus of claim 20 wherein the tool has an insertion portion configured to engage the cartridge case, the outer surface of the insertion portion being smooth to facilitate insertion of the insertion portion into the mouth of the cartridge case to engage an interior surface of the cartridge case without removing material from the cartridge case.

* * * * *